United States Patent [19]

Beim

[11] Patent Number: 4,686,869
[45] Date of Patent: Aug. 18, 1987

[54] RATIO CHANGE GEAR SPEED SYNCHRONIZING IN A TRACTOR TRANSMISSION

[75] Inventor: Rudolf Beim, Southfield, Mich.

[73] Assignee: Ford Motor Company, Dearborn, Mich.

[21] Appl. No.: 818,448

[22] Filed: Jan. 13, 1986

[51] Int. Cl.⁴ .............................................. F16H 3/02
[52] U.S. Cl. ...................................... 74/745; 74/356; 74/360
[58] Field of Search ................ 74/356, 360, 359, 334, 74/335, 336 R, 357, 740, 745

[56] References Cited

U.S. PATENT DOCUMENTS

| | | | |
|---|---|---|---|
| 2,982,153 | 5/1961 | Albertson et al. | 74/740 |
| 3,774,460 | 11/1973 | Browning et al. | 74/740 X |
| 3,774,474 | 11/1973 | Recker et al. | 74/335 X |
| 3,774,475 | 11/1973 | Meysenburg et al. | 74/335 X |
| 3,799,003 | 3/1974 | Van Dest | 74/740 |
| 4,245,514 | 1/1981 | Miyahara et al. | 74/336 R X |
| 4,498,356 | 2/1985 | Vater et al. | 74/335 X |
| 4,532,827 | 8/1985 | Beim | 74/745 |
| 4,637,269 | 1/1987 | Hasegawa et al. | 74/335 |

FOREIGN PATENT DOCUMENTS

| | | | |
|---|---|---|---|
| 2036208 | 6/1980 | United Kingdom | 74/359 |
| 2116268 | 9/1983 | United Kingdom | 74/740 |

Primary Examiner—Leslie Braun
Assistant Examiner—Joseph M. Rolnicki
Attorney, Agent, or Firm—Frank G. McKenzie; Donald J. Harrington

[57] ABSTRACT

A tractor transmission includes a pair of dual power clutches that connects an engine to an input shaft through a gearset that selectively makes a direct connection or overdrives the shaft in accordance with the engaged or disengaged state of the clutches. A synchronizer connects the input shaft to an interior shaft of the transmission. A gear selector moves the sleeve of the synchronizer into engagement either with a gear on the input shaft or a gear on the interior shaft. When certain upshifts are made, the gear selector causes the clutch that overdrives the input shaft gear to disengage and the clutch that directly connects the input shaft gear to the engine to engage. This action slows the gear toward the synchronous speed at which the synchronizer connects the input gear to the interior shaft with minimal shifting effort.

8 Claims, 4 Drawing Figures

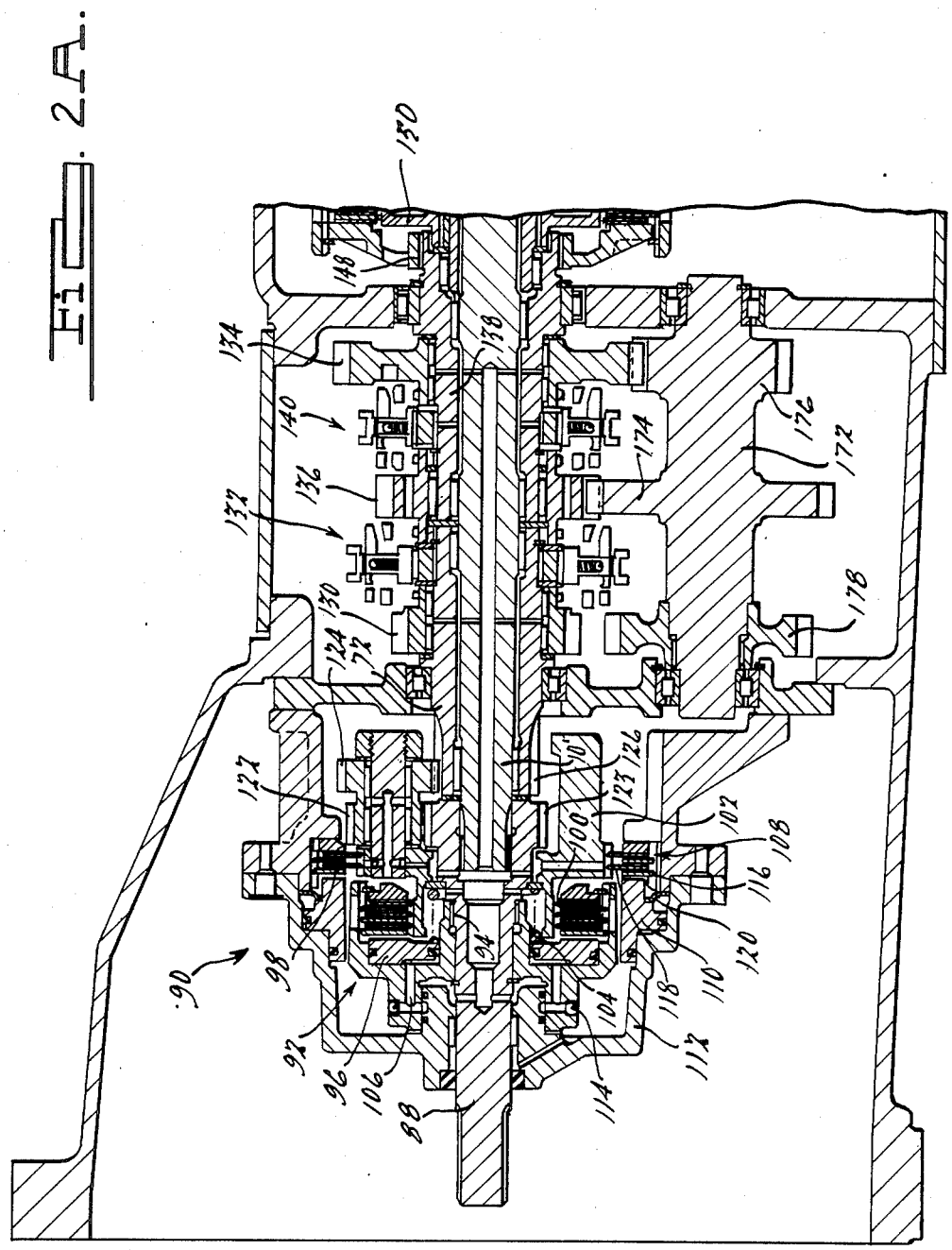

|  | Clutch 20/108 | Clutch 22/90 | Clutch 144 | Clutch 146 | Sychro 132 | Sychro 140 | Sychro 182 |
|---|---|---|---|---|---|---|---|
| 1 |  | ✓ |  | ✓ |  | → | → |
| 2 |  | ✓ | ✓ |  |  | → |  |
| 3 | ✓ |  |  | ✓ |  | → |  |
| 4 | ✓ |  | ✓ |  |  | → |  |
| 5 |  | ✓ |  | ✓ |  | ← |  |
| 6 |  | ✓ | ✓ |  |  | ← |  |
| 7 | ✓ |  |  | ✓ |  | ← |  |
| 8 | ✓ |  | ✓ |  |  | ← | → |
| 9 |  | ✓ |  | ✓ |  | → | ← |
| 10 |  | ✓ | ✓ |  |  | → |  |
| 11 | ✓ |  |  | ✓ |  | → |  |
| 12 | ✓ |  | ✓ |  |  | → |  |
| 13 |  | ✓ |  | ✓ |  | ← |  |
| 14 |  | ✓ | ✓ |  |  | ← |  |
| 15 | ✓ |  |  | ✓ |  | ← |  |
| 16 | ✓ |  | ✓ |  |  | ← | ← |
| Reverse |  |  |  |  | ← |  |  |
| Forward |  |  |  |  | → |  |  |

FIG. 3.

RATIO CHANGE GEAR SPEED SYNCHRONIZING IN A TRACTOR TRANSMISSION

BACKGROUND OF THE INVENTION

1. Field of the Invention

This invention relates to the field of multiple speed ratio transmissions. More particularly, the invention pertains to an apparatus and method for changing speed ratios in such a transmission by slowing a gear through selectively operated clutches. This invention pertains to the field of synchronized shifting among the various speed ratios of a multiple speed tractor transmission.

2. Description of the Prior Art

In multiple speed ratio transmissions of the type that employ synchronizers to driveably connect selected gears to a shaft, the synchronizers are forced first toward the gear to be connected to engage frictionally the gear with a conical surface on the synchronizer. This process, called synchronization, brings the shaft, synchronizer and gear to approximately the same speed before the gear is connected mechanically by engagement of splines on the synchronizer sleeve with dog teeth on the gear. The surfaces of the components that are forced frictionally into contact to produce the synchronism are conical. Therefore, the axially directed force required to move the synchronizer sleeve has only a minor component in the radial direction to develop the frictional engagement on the gear. The amount of shifting effort in moving the synchronizer from the neutral position to the engaged position varies, therefore, in accordance with the amount of braking force that must be applied to the gear before the speeds are made up synchronous. Furthermore, reflected inertia on the gear, in addition to its own inertia, must be accomodated and includes the inertia of the rotating components that remain driveably connected to the gear during synchronization. The effective rotational inertia of the gear can be very large, especially where speed reduction gearsets located partly on a countershaft are employed. The reflected inertia of these components adds to the inertia of the gear and must be slowed by the synchronizer prior to driveably connecting the gear to the shaft. Speed reduction gearsets amplify the amount of inertia that is applied to the gear connected by the synchronizer.

The amount of shifting effort required of the vehicle operator to connect the gear to the shaft through the synchronizer should be kept as low as possible. It is preferred in making shifts of this sort, through operation of a synchronizer, that the gear be driveably disconnected from the source of power before synchronism is attempted to keep shifting efforts at a minimum.

Occasionally in making upshifts among gear ratios in a tractor transmission that has the capacity to produce a large number of speed ratios, a gear to be connected to a shaft by a synchronizer turns at a substantially higher speed than the speed of the shaft. Conventionally, substantially greater effort is required to move the synchronizer to the engaged position in order to slow the gear and overcome its inertia and the inertia of the components that are driveably connected to the gear.

SUMMARY OF THE INVENTION

The multiple speed ratio tractor transmission according to this invention includes two hydraulic clutches carried on a shaft, which is driveably connected by a neutral friction clutch to an engine shaft. The output of these clutches is connected to the transmission input shaft by a coupler. One of these clutches overdrives the input shaft at a speed that is substantially greater than the speed of the engine. The other clutch produces a direct drive connection between the engine and transmission input shaft. The clutches are pressurized and vented alternately so that only one clutch is fully engaged and the other clutch is fully disengaged to produce a driveable connection between the engine and the transmission input.

The gear arrangement includes a first synchronizer carried on and turning with an intermediate shaft of the transmission, moveable between a neutral position and a position where the synchronizer produces a driveable connection between a gear and the shaft that carries the synchronizer. The first synchronizer can be moved also from the neutral position to another driving position that connects a second gear to the shaft on which the synchronizer is carried.

The first synchronizer is followed in the driveline by third and fourth hydraulically actuated clutches which driveably connect the synchronizer shaft to other intermediate shafts of the transmission depending on whether the third clutch or the fourth clutch is pressurized.

The gear arrangement is such that upshifts are made between certain adjacent speed ratios by shifting the synchronizer from engagement with the second gear to a position of engagement with the first gear, by disengaging the third clutch and engaging the fourth clutch and by disengaging the first clutch and engaging the second clutch. The gear selector of the transmission is connected to an electrical switch which effects the connection between a source of electrical power and a solenoid whose state determines whether a source of pressurized hydraulic fluid is connected to the overdriven clutch or to the direct drive clutch located between the engine and a first synchronizer.

In the process of shifting, the synchronizer is first brought to the neutral position where it is disconnected from the first and second gears. While in this position, the clutch through which the transmission input shaft is overdriven, is disengaged while the direct drive clutch is engaged. When this exchange of power from the overdrive clutch to the direct drive clutch is made, the transmission input shaft and the first gear are slowed from the overdrive speed to the direct drive speed by means of the braking effect of the engine. This exchange of power between the clutches causes the first gear to be slowed toward the synchronous speed required to shift the synchronizer sleeve from the neutral position to the position that driveably connects the gear to the synchronizer shaft. When the exchange of power between the clutches is completed, the synchronizer sleeve is then moved to a position of engagement with the first gear.

BRIEF DESCRIPTION OF THE DRAWING

FIGS. 2A and 2B are cross sections through the gear arrangement of a tractor transmission taken at a plane that includes the axis of the transmission input shaft, a countershaft and the output shaft of the transmission.

FIG. 3 is a schedule of the positions of various synchronizer sleeves and the states of various clutches that correspond to the several speed ratios produced by the transmission.

DESCRIPTION OF THE PREFERRED EMBODIMENT

Figure 1:
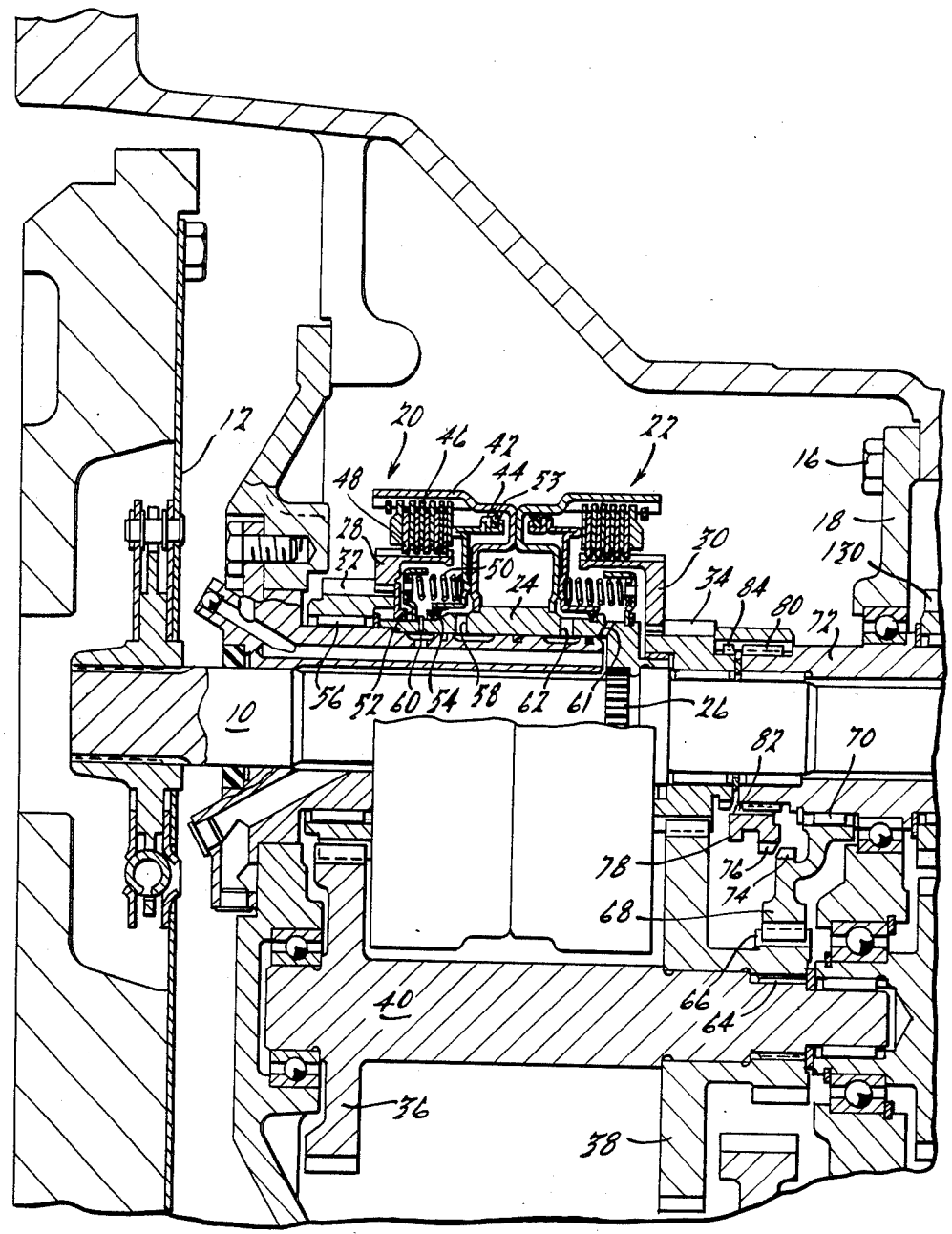
FIG. 1 is a cross section through a plane that contains the axes of the engine shaft and transmission input shaft at the front portion of a tractor transmission according to this invention.

The output shaft of an engine is driveably connected to the power take off shaft 10 of a tractor transmission through a neutral clutch 12. The transmission is housed in a casing 14 comprising several segments which are joined at bolted connections 16. A bulkhead or web 18, connected to the casing, supports various shafts, gears, clutches and synchronizers.

A first hydraulically actuated disc clutch assembly driveably connects shaft 10 to first and second output components of the clutches. For example, when a first clutch 20 or a second clutch 22 is engaged, shaft 10 is connected to clutch output components 28 or 30, respectively. The input element 24 of the clutches is joined at a spline 26 to shaft 10; their output components 28, 30 are rotatably supported on the shaft and are formed integrally with gears 32, 34, which are in continuous meshing engagement with pinions 36, 38. These pinions are rotatably supported on countershaft 40, which is substantially parallel to the axis of shaft 10.

Clutch 20 includes a hydraulic cylinder 42 driveably connected to the input component 24, a piston 44, a first set of clutch discs 46 splined to the cylinder 42, a second set of clutch discs 48 splined to output component 28, a spring retainer 52, a coiled compression spring 50 fitted between the spring retainer and the piston, seals 53, 54 for hydraulically sealing the pressurized portion of the cylinder from the unpressurized portion, and a bearing 56 for rotatably supporting the output component on shaft 10. The hydraulic system of the transmission connects a source of high pressure hydraulic fluid through a hydraulic passage 58 to the interior of the cylinder. The low pressure portion of the cylinder is connected by passage 60 to a reservoir or sump at atmospheric pressure.

Clutch 22 includes corresponding components to those described with respect to clutch 20 and functions in the same way as clutch 20 when its cylinder is pressurized through passage 62 from the source of hydraulic pressure. Clutches 20 and 22 are operated alternately; they are not fully engaged concurrently during any of the forward drive, reverse drive or creeper speed ratio conditions.

When clutch 20 is energized, its cylinder is pressurized and the clutch discs 46, splined to the cylinder, are forced into frictional contact with discs 48, splined on the output component 28. When the pressure in the cylinder rises sufficiently, the input component 24 is driveably connected to the output component 28 and driveably connects shaft 10 and gear 32. Similarly, when clutch 22 is pressurized, a driveable connection is made through engagement of the corresponding disc sets between shaft 10 and gear 34.

Pinion 36 is formed integrally with countershaft 40 and pinions 38, 66 are connected by spline 64 to the countershaft. Pinion 66 is in continuous engagement with creeper gear 68, which is rotatably mounted by bearing 70 on the outer surface of the transmission input shaft 72. Shaft 10, the power takeoff shaft, extends from the front of the transmission to the rear through a bore in shaft 72. The gear wheel on which creeper gear 68 is formed includes a set of dog teeth 74 engageable by a corresponding set of dog teeth 76 located on the circumference of a coupler 78. Located at the forward end of the input shaft is a set of splines 80, with which the splines 82 on the inside diameter of coupler 78 are continuously engaged. Located at the rearward end of the output component 30 of clutch 22 is a set of dog teeth 84, which is engageable by the splines 82 of the coupler. The coupler is mounted for axial sliding movement on the input shaft and remains continuously engaged with the input shaft.

When coupler 78 is moved rearward from the neutral position shown in the figure, it is brought into driveable engagement with creeper gear 68. When the coupler is moved forward from the neutral position, it is brought into driveable engagement with the output component of clutch 22.

The device according to this invention will produce, through selective operation of clutches 20 and 22, a dual power input between the engine shaft and the input shaft 72 of the transmission. When clutch 20 is engaged, clutch 22 is disengaged, coupler 78 is moved forward to its normal position, and output shaft 72 is overdriven with respect to the engine, i.e., the speed of shaft 72 is greater than the engine speed. When the clutches and coupler are so disposed, power is transmitted from power takeoff shaft 10 through clutch 20, gear 32, pinion 36, spline 64, pinion 38, gear 34 and coupler 78 to the input shaft 72. The relative sizes of the meshing gears and pinions 32, 40 and 38, 34 cause input shaft 72 to be overdriven approximately 1.6 times the speed of shaft 10.

When clutch 22 is engaged, clutch 20 is disengaged and coupler 78 is moved forward to its normal position, shaft 10 is connected to the input shaft 72 through the torque delivery path that includes spline 26, the discs of clutch 22, output component 30 and coupler 78. This torque delivery path causes the input shaft 72 to be driven at the speed of shaft 10.

The dual power input mechanism connects the engine through clutches 20 and 22 either directly to the transmission input or through the speed reduction gearset to the transmission input. However, in addition to the dual power input, the creeper mechanism according to this invention has the capacity to produce a speed reduction between the engine and the transmission input by moving the coupler rearward from the position of engagement with the output of clutch 22 and into engagement with creeper gear 68. When this is done, selective engagement of clutches 20 and 22 produces two ratios of the speed of the input shaft with respect to the engine shaft.

The creeper speed mechanism produces the higher creeper speed ratio or the lower torque ratio when clutch 20 is engaged, clutch 22 is disengaged and coupler 78 is moved rearward to the creeper speed position. With these components so disposed, the torque delivery path between shaft 10 and input shaft 72 includes clutch 20, gear 32, pinion 36, creeper pinion 66, creeper gear 68, dog teeth 74, 76 and coupler 78.

The creeper speed mechanism produces the lower creeper speed ratio and the higher torque ratio when clutch 20 is disengaged, clutch 22 is engaged and coupler 78 is moved rearward to bring its dog teeth 76 into engagement with the dog teeth 74 on the creeper gear wheel 68. With these components so disposed, the torque delivery path that connects shaft 10 to shaft 72 includes clutch 22, gear 34, pinion 38, creeper pinion 66, creeper gear 68, dog teeth 74, 76, and coupler 78.

From the relative sizes of the engaged gears and pinions of this torque path, it can readily be seen that the speed of input shaft 72 is substantially slower than the engine speed. From the relative sizes of the engaged gears and pinions of the other torque path, the input shaft speed is seen to be higher than its speed when clutch 22 is engaged and clutch 20 is disengaged, for a constant engine speed.

Alternatively, the dual power clutches 20, 22, countershaft 40 and the associated pinions 32, 34, 36, 38, 66 can be replaced by the dual power mechanism 92 shown in FIG. 2A. In this embodiment, the power takeoff shaft 10' can be driveably connected by a neutral friction clutch such as clutch 12 of FIG. 1, which is connected to shaft 10' by way of a spline located at the left-hand end of the power takeoff shaft. Here the dual power mechanism includes a first hydraulic clutch 90 that includes a cylinder driveably connected by a spline 94 to the dual power shaft 88, a piston 96 moveable within the cylinder, first and second sets of clutch discs 98, 100, connected respectively to the cylinder and to the output component 102, and a helical coiled spring 104. A source of pressurized hydraulic fluid communicates through hydraulic passage 106 to the interior of the cylinder.

The transmission control logic causes the hydraulic pressure source to pressurize the cylinder, which action causes piston 96 to move against the clutch discs forcing them rearward into mutual frictional contact, thereby producing a driveable connection between shaft 88 and output component 102. When the hydraulic pressure source is disconnected from clutch 92, spring 104 forces piston 96 out of contact with the clutch discs, disengages shaft 88 from the output 102 and piston 96 returns to the position shown in FIG. 2A.

A brake 108 includes a piston 110, which is moved axially within the bounds of the casing 112 when the hydraulic pressure source is connected to the cylinder in which piston 110 moves; a first set of brake discs splined to the transmission housing; a second set of discs 118 splined to the output of brake 108 and a spring washer 120, which contacts the housing and the piston and applies a spring force to the piston tending to move it to the position shown in FIG. 2A, the position it assumes when the cylinder or brake 108 is vented.

When brake 108 is engaged, the output or carrier 102 is driveably connected to the transmission housing, fixed against rotation. Carrier 102 provides a rotatable support surface upon which a planet pinion wheel is rotatably mounted. The first planet pinion 122 is in continuous meshing engagement with the gear 123 that is formed integrally with the dual power shaft 88, and the second planet pinion is in continuous meshing engagement with the gear 126 formed on the end of input shaft 72.

When clutch 90 is pressurized and brake 108 is vented, dual power shaft 88 is directly connected without speed reduction to transmission input shaft 72 because spline 94 and clutch 90 fix carrier 102 to shaft 88 so that the two rotate at the same speed. The pitch diameter of planet gear 124 is approximately the same as the pitch diameter of gear 126; therefore, there is no speed reduction. However, when clutch 90 is vented and brake 108 is pressurized, transmission input shaft 72 is driven approximately 60% faster than the speed of the dual power shaft 88 and the engine.

Reverse pinion 130 is rotatably mounted on the input shaft and reverse-forward synchronizer 132 is rotatably fixed to the input shaft. A low speed ratio forward drive gear 134 and a higher speed ratio forward drive gear 136 are rotatably mounted on transmission shaft 138, located immediately behind the input shaft. Gears 134, 136 are selectively driveably connected to shaft 138 through operation of synchronizer 140, which is driveably connected by a spline to shaft 138.

A third transmission shaft 142 is rotatably supported on PTO shaft 10' and on the transmission casing by bearings located at each of its axial ends. This shaft carries third and fourth hydraulically actuated clutches 144, 146, the same type as clutches 20 and 22 described with reference to FIG. 1. Clutch 144 has its input connected by a spline 148 to shaft 138 and has its output 150 splined to shaft 142. This clutch includes a piston 152, which is slideably mounted within a cylinder of the clutch. First and second sets of clutch discs 154, 156 are splined respectively to the clutch cylinder and to the output 150. When the cylinder is pressurized, piston 152 forces the clutch disc sets into mutual frictional drive engagement, whereby shaft 138 is connected to shaft 142.

Clutch 146 has its output element 160 fixed to shaft 158 and includes a cylinder 162, which is fixed to cylinder 164 of clutch 144. Clutch 146 includes first and second sets of discs 166 and 168, which are splined respectively to cylinder 162 and to the output 160. When the cylinder is pressurized, piston 170 moves rearward and forces the discs of the first and second disc sets into mutual frictional driving engagement, whereby shaft 138 is connected to shaft 158.

A second countershaft 172 is rotatably mounted on the transmission casing by bearings and is aligned parallel with the axis of PTO shaft 10'. Shaft 172 includes an integrally formed forward drive pinion 174, which is in continuous meshing engagement with the higher speed gear 136; pinion 176, which is in continuous meshing engagement with the lower speed gear 134; and reverse pinion 178, which is continuously engaged with a reverse idler (not shown). The idler is continuously engaged with reverse gear 130.

The transmission output shaft 180, the PTO shaft and countershaft 40 or 172 are aligned substantially mutually parallel. Shaft 180 is rotatably supported on the transmission casing by bearings and carries a high-low synchronizer 182, which is connected to the output shaft by a spline. Rotatably supported on the output shaft are a low speed output gear 184, which is in continuous meshing engagement with a low speed output pinion 186 formed integrally with shaft 142; a high speed output gear 188, which is in continuous meshing engagement with high speed output pinion 190 fixed to the shaft 142; and a pinion 192, which is formed integrally with or continuously connected to high speed output gear 188 and is in continuous meshing engagement with gear 194 formed integrally with shaft 158.

Figure 2B:
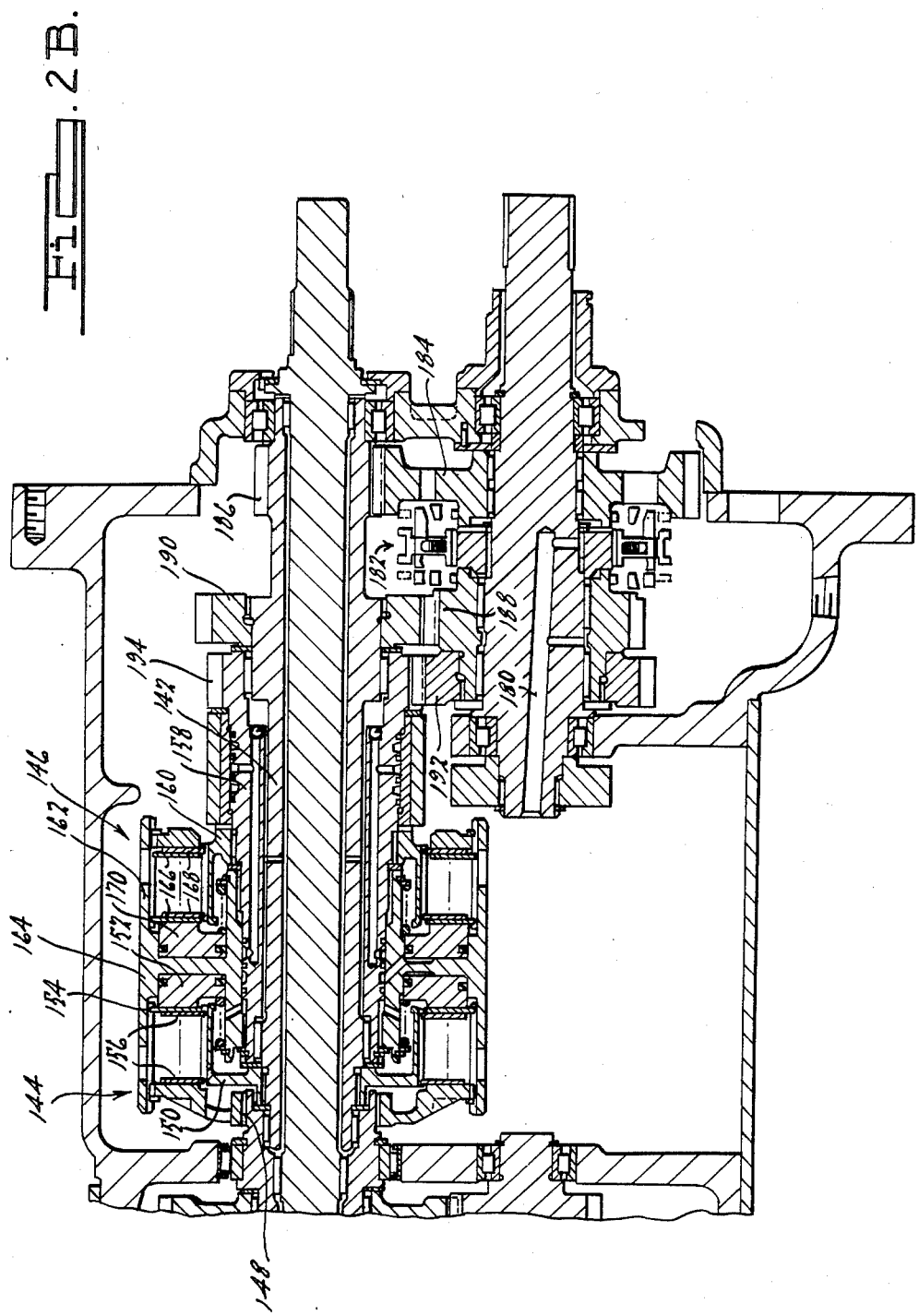

In the schedule of FIG. 3, a check mark is entered in the column representing the clutch that is engaged to produce each of the 16 speed ratios represented by rows in the figure. Blanks in the column under the clutch headings indicate that the corresponding clutch is disengaged or vented when the corresponding speed ratio is produced. Under the column heading "Synchro 132" the arrows represent the direction that the synchronizer is moved to produce the forward drive ratios (the last row entry) and the reverse drive ratios (the penultimate row entry). Under the column heading "Synchro 140", the arrows indicate the direction that the synchronizer sleeve is moved for the corresponding speed ratios. For example, when the sleeve of synchronizer 140 is moved rearward, the speed ratios 1–4 and 9–12 are produced; when it is moved forward, then speed ratios 5–8 and 13–16 are produced. In the column under heading "Synchro 182", the arrows indicate the direction that the synchronizer sleeve is moved to produce the various speed ratios. For example, rearward movement produces speed ratios 1–8 and forward movement produces speed ratios 9–16. All of the movement represented in FIG. 3 is with reference to the positions of the various components as shown in FIGS. 2A and 2B.

The torque delivery paths are described next with reference to the components of the transmission assumed to have the positions and the engaged and vented states as indicated in FIG. 3. The creeper speed mechanism is assumed to be unselected and coupler 78 is in position to connect the output of clutch 22 or 90 to shaft 72. Only the forward drive ratios are discussed, therefore, synchronizer 132 connects shaft 72 to gear 136. The torque delivery paths for reverse drive are identical to those of the forward drive except for the position of this synchronizer sleeve.

The first and second speed ratios occur when dual power clutch 22 or 90 is engaged and the other dual power clutch 20 or brake 108 is disengaged. The torque delivery path for the first drive ratio includes input shaft 72, synchronizer 132, gear 136, pinion 174, pinion 176, gear 134, synchronizer 140, shaft 138, clutch 146, gear 194, pinion 192, pinion 188, gear 190, gear 186, pinion 184, synchronizer 182 and output shaft 180. The torque delivery path for the ninth speed ratio includes the same components as for the first speed ratio except that synchronizer 182 is moved forward, where it connects pinion 188 to the output shaft. Therefore, to produce the ninth speed ratio, gears 186 and 190 and pinion 184 are not involved, instead pinion 188 is connected by synchronizer 182 to the output shaft.

To shift from the first speed ratio to the second speed ratio, clutch 146 is vented and clutch 144 is pressurized. The torque delivery path for the second speed ratio involves the same components as for the first speed ratio up to and including the output of shaft 138. Thereafter, the second speed ratio torque delivery path includes clutch 144, shaft 142, gear 186, pinion 184, synchronizer 182 and the output shaft 180. To produce the tenth speed ratio, the components are disposed as they are for the second speed ratio, except that the sleeve of synchronizer 182 is moved forward to connect pinion 188 to the output shaft. The torque delivery path for the tenth speed ratio is the same as it is for the second speed ratio up to and including shaft 142. Thereafter, the torque delivery path for the tenth speed ratio includes gear 190, pinion 188, synchronizer 182 and output shaft 180.

To produce the third, fourth, eleventh and twelfth speed ratios, clutch 20 or 108 is pressurized and clutch 22 or 90 is vented. To produce the third and eleventh speed ratios, clutch 146 is pressurized and clutch 144 is vented. To produce the fourth and twelfth speed ratios, clutch 144 is pressurized and clutch 146 is vented. The torque delivery path for the third speed ratio includes dual power clutch 20 or 108, which drives the input shaft 72 directly without speed reduction, synchronizer 132, gear 136, pinion 174, pinion 176, gear 134, synchronizer 140, shaft 138, clutch 146, shaft 142, gear 194, pinion 192, pinion 188, gear 190, gear 186, pinion 184, synchronizer 182 and output shaft 180. The torque delivery path for the fourth speed ratio is the same as for the third speed ratio up to and including shaft 138. Thereafter, the fourth speed ratio torque delivery path includes clutch 144, shaft 142, gear 186, pinion 184, synchronizer 182 and output shaft 180.

To produce the eleventh speed ratio, the clutches and synchronizers are disposed as they are for the third speed ratio except that the sleeve of synchronizer 182 is moved forward. The torque delivery path for the eleventh speed ratio is the same as it is for the third speed ratio up to and including pinion 188. Thereafter, the torque delivery path for the eleventh speed ratio includes synchronizer 182 and output shaft 180. The torque delivery path for the twelfth speed ratio is the same as it is for the fourth speed ratio up to and including shaft 142. Thereafter, the torque delivery path for the twelfth speed ratio includes gear 190, pinion 188, synchronizer 182 and output shaft 180.

To upshift or downshift between the fourth and fifth speed ratios, the eighth and ninth speed ratios, and between the twelfth and thirteenth speed ratios requires that synchronizer 140 be shifted first out of engagement with gear 134 or gear 136 and then to a neutral position where the synchronizer engages neither gear 134 nor gear 136. When synchronizer 140 moves to the neutral position, the gear selector of the transmission actuates an electrical solenoid valve through which clutches 144 and 146 are vented concurrently. After these clutches are vented and while synchronizer 140 is in the neutral position, the engaged or disengaged state of overdrive dual power clutch 20 or 108 is changed and the state of the direct dual power clutch 22 or 90 is changed. Then the sleeve of synchronizer 140 is moved from the neutral position to a position where either of the adjacent gears 134 or 136 is connected to shaft 138. Finally, clutches 144 and 146 are pressurized and vented in accordance with the schedule of FIG. 3 to produce the gear ratios 5–8 and 13–16, when an upshift is made, or gear ratios 1–4 and 9–12, when a downshift is made.

When this sequence is performed to produce an upshift, the rotational speed of gear 136 is slowed by engine braking to reduce the shift effort required by the vehicle operator to move synchronizer 140 due to the inertia and reflected inertia of the components that precede synchronizer 140 in the torque delivery path. If gear 136 were not slowed, the frictional contact between the synchronizer cone and the conical block on the gear would have to be supplied in the form of axial shifting effort applied to the gear selector of the transmission by the vehicle operator.

In making a change from the fourth to the fifth speed ratios, from the eighth to the ninth speed ratios, and from the twelfth to the thirteenth speed ratios, the overdrive clutch 20 or 108 of the dual power mechanism is being disengaged and the direct drive clutch 22 or 90 is being engaged. Therefore, the speed of the input shaft must be slowed though the transmission is shifting to a higher speed ratio. By completely engaging the direct drive clutch 22 or 90 after the overdrive dual power clutch 20 or 108 becomes disengaged, input shaft 72 and gear 136 are slowed by the effect of engine breaking through the friction clutch 12 and PTO shaft 10' before the sleeve of synchronizer 140 is moved from the neutral position to the engaged position with gear 136.

The fifth and thirteenth speed ratios result when the direct drive clutch 20 or 90 is engaged, clutch 20 or 108 is disengaged and synchronizer 140 is moved forward into engagement with gear 136. Synchronizer 182 is at the low or rearward position to produce the speed ratios 5 through 8, and it is moved to the high or forward position to produce speed ratios 13 through 16.

The torque delivery path for the fifth speed ratio includes clutch 22 or 90, coupling 78, input shaft 72, synchronizer 132, gear 136, synchronizer 140, shaft 138, clutch 146, shaft 158, gear 194, pinion 192, pinion 188, gear 190, gear 186, pinion 184, synchronizer 182, and output shaft 180. The torque delivery path for the thirteenth forward speed ratio is the same as for the fifth speed ratio up to and including pinion 188. Thereafter, the torque delivery path for the thirteenth speed ratio includes synchronizer 182 and output shaft 180.

The torque delivery path for the sixth forward speed ratio is the same as for the fifth speed ratio up to and including shaft 138. Thereafter, the torque delivery path for the sixth speed ratio includes clutch 144, shaft 142, gear 186, pinion 184, synchronizer 182, and output shaft 180. The torque delivery path for the fourteenth speed ratio is the same as for the sixth speed ratio up to and including pinion 188. Thereafter, the torque delivery path for the fourteenth speed ratio includes synchronizer 182 and output shaft 180.

Speed ratios 7, 8, 15 and 16 result when the overdrive dual power clutch 20 or 108 is engaged and the direct drive dual power clutch 22 or 90 is disengaged. Speed ratios 7 and 15 result when clutch 146 is engaged. Speed ratios 8 and 16 result when clutch 144 is engaged. Speed ratios 7 and 8 result when synchronizer 182 is in the rearward position; speed ratios 15 and 16 result when synchronizer 182 is the in forward position.

The torque delivery path for the seventh speed ratio includes clutch 20 or 108, coupling 78, shaft 72, synchronizer 132, gear 136, synchronizer 140, shaft 138, clutch 146, shaft 158, gear 194, pinion 192, pinion 188, gear 190, gear 186, pinion 184, synchronizer 182, and output shaft 180. The torque delivery path for the eighth speed ratio is the same as for the seventh speed ratio up to and including shaft 138. Thereafter, the torque delivery for the eighth speed ratio includes clutch 144, shaft 142, gear 186, pinion 184, synchronizer 182 and the output shaft 180.

The torque delivery path for the fifteenth speed ratio is the same as for the seventh speed ratio up to and including pinion 188. Thereafter, the torque delivery path for the fifteenth speed ratio includes synchronizer 182 and output shaft 180. The torque delivery path for the sixteenth speed ratio is the same as for the eighth speed ratio up to and including shaft 142. Thereafter, the torque delivery path for the sixteenth speed ratio includes gear 190, pinion 188, synchronizer 182 and output shaft 180.

In downshifting from the eighth to the ninth speed ratios, from the fifth to the fourth speed ratios and from the thirteenth to the twelfth speed ratios, the same procedure as was previously described with respect to upshifting between these ratios is performed. First, through operation of the gear selector, clutches 144 and 146 are disengaged by venting them concurrently. Then synchronizer 140 is moved to the neutral position, clutch 20 or 108 is engaged and clutch 22 or 90 is disengaged. This action causes input shaft 71 and gear 136 to accelerate from the speed they had prior to the downshift, i.e., from the speed that corresponds to its overdriven speed, to the speed of the engine. Then synchronizer 140 is moved from the neutral position rearward to the low speed position.

Having described a preferred embodiment of my invention, what I claim and desire to secure by U.S. Letters Patent is:

1. A transmission for producing multiple speed ratios comprising:
   a first shaft adapted for connection to a power source, an input shaft, a second shaft, a third shaft, a fourth shaft, a countershaft, and an output shaft;
   first gearing means for producing multiple speeds of the input shaft in relation to the speed of the first shaft;
   first clutch means for selectively driveably connecting the first shaft to the input shaft through the first gearing means, whereby the input shaft is driven at various speeds in accordance with the selected operation of said first clutch means;
   a second gearing means including multiple pairs of meshing gears and pinions carried on the input shaft the second shaft and the countershaft;
   first synchronizer clutch means for driveably connecting the gear-pinion pairs of the second gear means selectively to the second shaft;
   second clutch means for driveably connecting the second shaft to the third shaft;
   third clutch means for driveably connecting the second shaft to the fourth shaft;
   third gearing means including multiple gear-pinion pairs including gears carried on the third shaft and fourth shaft meshing with pinions carried on the output shaft; and
   second synchronizer clutch means for driveably connecting the gear-pinion pairs of the third gearing means selectively to the output shaft.

2. The transmission of claim 1 further including:
   reverse drive gearing means carried on the input shaft and countershaft for reversing the direction of rotation of the countershaft from its forward drive direction of rotation; and
   forward-reverse synchronized clutch means for driveably connecting selectively the reverse drive gearing means to the input shaft and a gear-pinion pair of the second gearing means to the input shaft.

3. The transmission of claim 2 wherein the second gearing means includes a first high speed gear-pinion pair and a first low speed gear-pinion pair, each pair located on an opposite side of the first synchronizer clutch means, the forward-reverse synchronizer clutch means being located between the reverse drive gearing means and the first high speed gear-pinion pair for selectively driveably connecting the first high speed gear-pinion pair of the second gearing means to the input shaft.

4. The transmission of claim 1 wherein the third gearing means includes:
   a first pinion fixed to the third shaft;
   second and third pinions fixed to the fourth shaft;
   a first output gear wheel rotatably supported on the output shaft including a first gear meshing with the first pinion, a second gear meshing with the second pinion;
   a second output gear wheel rotatably supported on the output shaft including a third gear meshing with the third pinion; and
   the second synchronizer clutch means selectively driveably connects the second gear and the third gear to the output shaft.

5. The transmission of claim 2 wherein the third gearing means includes:

a first pinion fixed to the third shaft;
second and third pinions fixed to the fourth shaft;
a first output gear wheel rotatably supported on the output shaft including a first gear meshing with the first pinion, a second gear meshing with the second pinion;
a second output gear wheel rotatably supported on the output shaft including a third gear meshing with the third pinion; and
the second synchronizer clutch means selectively driveably connects the second gear and the third gear to the output shaft.

6. The transmission of claim 3 wherein the third gear means includes:
a first pinion fixed to the third shaft;
second and third pinions fixed to the fourth shaft;
a first output gear wheel rotatably supported on the output shaft including a first gear meshing with the first pinion, a second gear meshing with the second pinion;
a second output gear wheel rotatably supported on the output shaft including a third gear meshing with the third pinion; and
the second synchronizer clutch means selectively driveably connects the second gear and the third gear to the output shaft.

7. The transmission of claim 2 further including creeper speed reduction means driven from the first gearing means; and
means for selectively driveably connecting the creeper speed reduction means to the input shaft.

8. The transmission of claim 1 wherein the first gearing means produces a direct drive connection and a torque reduction between the first shaft and input shaft.

* * * * *